Figure 1:
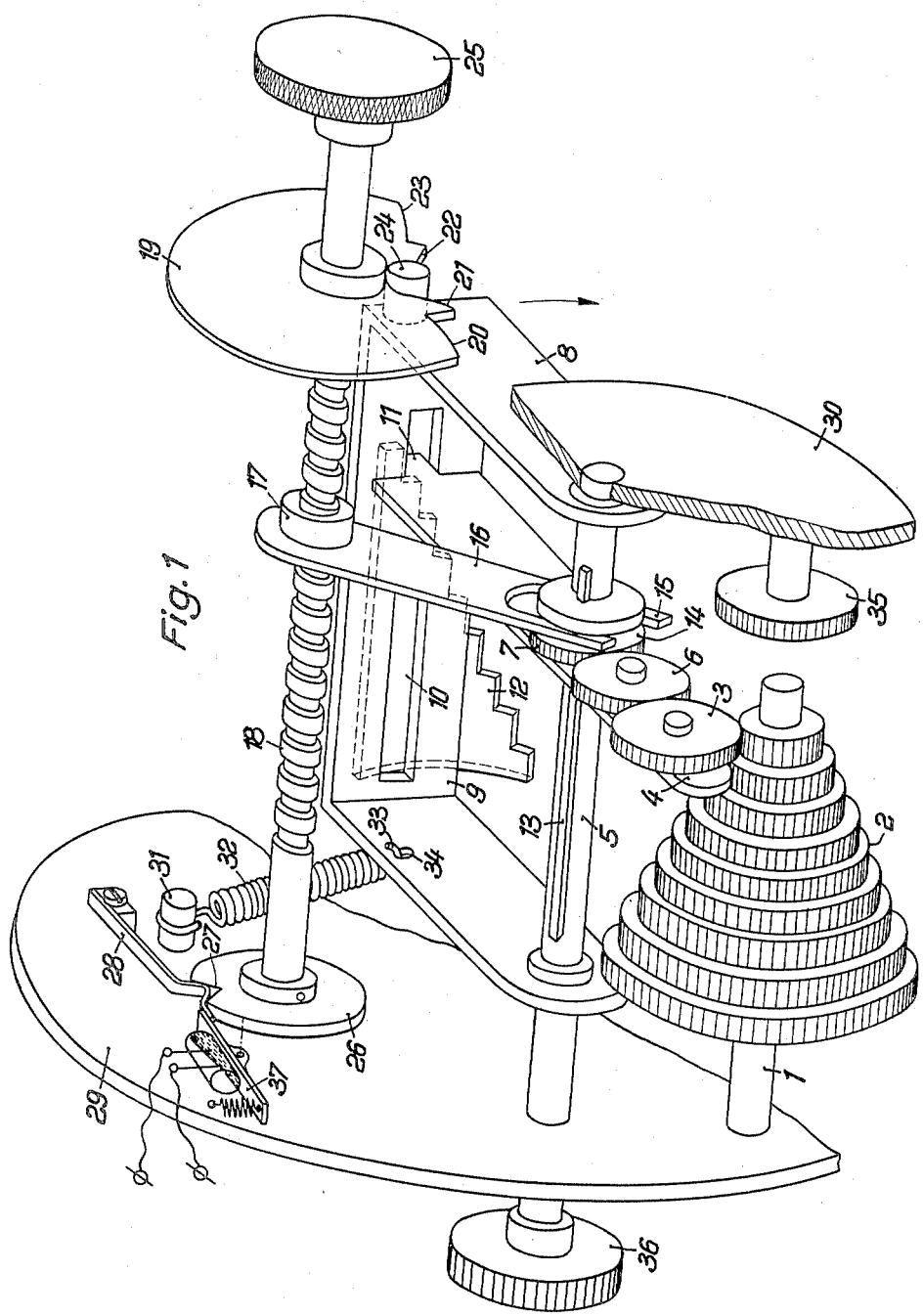

May 1, 1956 W. HAUPT 2,743,622
SETTING DEVICE FOR PRICE INDICATOR FOR LIQUIDS
Filed July 9, 1952 2 Sheets-Sheet 1

Inventor:
W Haupt

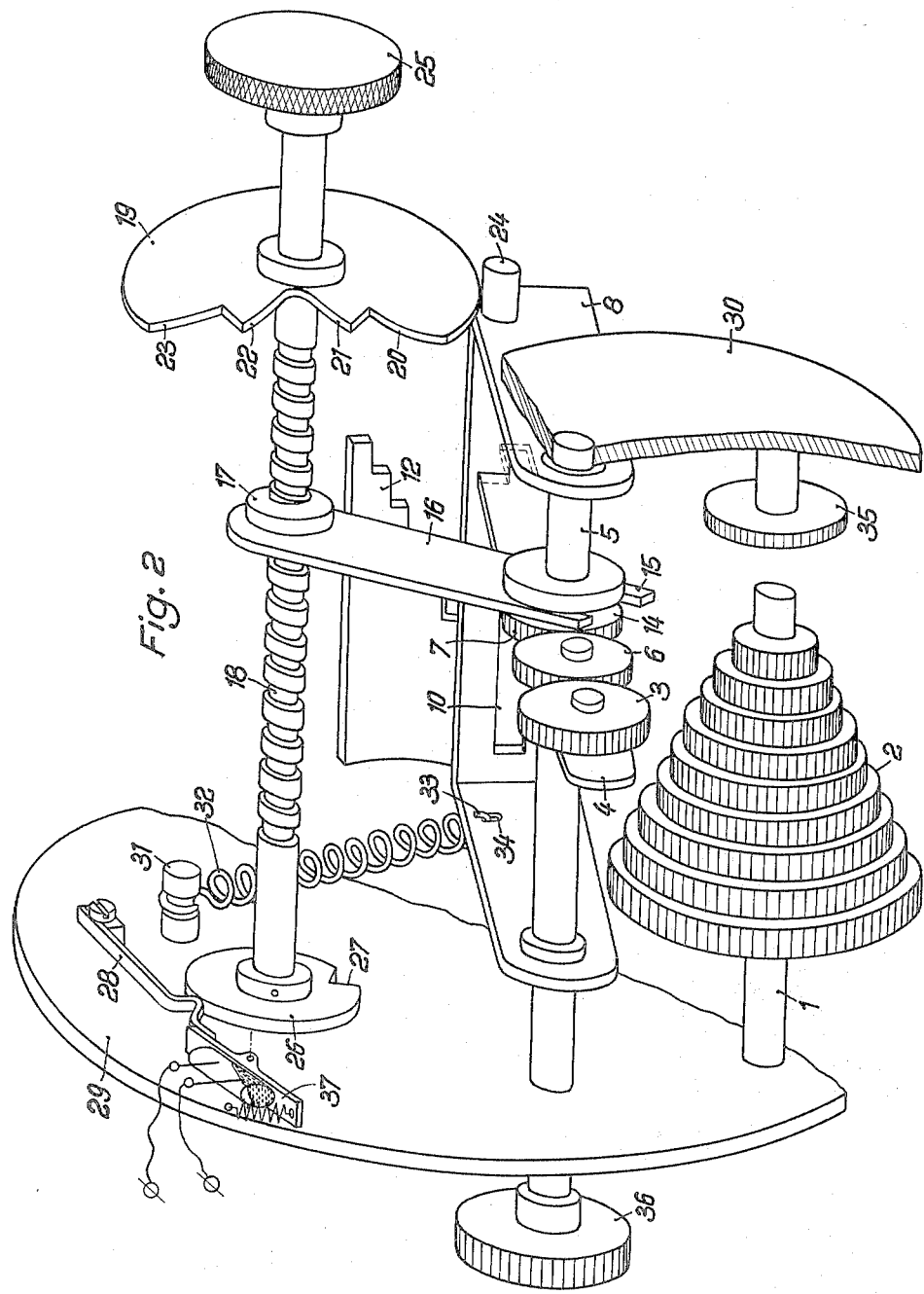

United States Patent Office 2,743,622
Patented May 1, 1956

2,743,622

SETTING DEVICE FOR PRICE INDICATOR FOR LIQUIDS

Wilhelm Haupt, Schwenningen (Neckar), Germany, assignor to Kienzle Apparate G. m. b. H., Villingen (Schwarzwald), Germany, a firm Application July 9, 1952, Serial No. 297,823

Claims priority, application Germany August 10, 1951

7 Claims. (Cl. 74—348)

The invention relates to a setting device for a price indicator for liquids of the type wherein the price per litre is variable and wherein the liquid flow meter drives a set of stepped wheels, one or more optionally adjustable toothed wheels being brought into engagement with said set of stepped wheels for the purpose of ascertaining the price of the quantity of liquid delivered.

It is an object of the present invention to provide a setting device of the type referred to which is of a very simple construction and operation.

With this and further objects in view, according to the present invention a swinging movement and a movement of displacement, the latter in the direction of the axis of the set of stepped wheels, are imparted to the wheel cooperating with the set of stepped wheels through a continuously movable member, for example a screw spindle provided with cams.

Other and further objects, features and advantages of the invention will be pointed out hereinafter and appear in the appended claims forming part of the application.

In the accompanying drawing a now preferred embodiment of the invention is shown by way of illustration and not by way of limitation.

Fig. 1 is an isometric view of the device, partly in section, showing the adjustable wheel in engagement with the smallest wheel of the set of stepped wheels, and Fig. 2 is a similar view, but showing the adjustable wheel out of engagement.

Referring now to the drawings in greater detail, in which similar reference numerals denote similar parts, it will be seen that a shaft 1 of the set of stepped wheels 2 is coupled to the flow meter, which is not shown. The set of stepped wheels 2 consists of nine fixedly interconnected spur wheels, the numbers of the teeth of which are in the ratio of 1:2:3 . . . :9. A swingable wheel 3 can be brought into engagement with the individual wheels of the set of stepped wheels 2 with the aid of a swinging arm 4, which is mounted on a shaft 5.

The swingable wheel 3 meshes through an intermediate wheel 6 with a wheel 7 which is movable on a shaft 5 provided with a key 13 but is not rotatable with respect to the shaft. Through the shaft 5, the wheel 7 drives a spur wheel 36, the number of revolutions of which is transmitted to an adding mechanism, which is not shown. The shaft 5 is journalled in plates 29, 30. Loosely arranged on the shaft 5 is a swinging stirrup 8 which, in its yoke or cross member 9, has a longitudinal slot 10. The swinging arm 4 carries at its rear end a tongue 11, which is guided in the longitudinal slot 10 of the yoke or cross member 9 of the swinging stirrup 8. The tongue 11 of the swinging arm 4 also abuts against one of the nine steps of a stepped plate 12. The movable wheel 7 has an annular groove 14, which is embraced by the forked end 15 of a bar 16 which is fixedly connected at its rear end to a nut 17, which can be adjusted by means of a screw spindle 18. Rigidly connected to said screw spindle is a disc 19 having curved portions 20, 21, 22, 23, a pin 24 being fixedly arranged on one arm of the swinging stirrup 8 and guided along said curved portions. On one end of the screw spindle 18 is mounted a turning knob 25 which is not rotatable with respect thereto and on the other end of the shaft 18 is mounted a locking disc 26 having a locking groove 27 in which a flat spring 28 catches in order to ensure the neutral or initial position.

On a plate 29 is mounted a peg 31 to which a tension spring 32 is attached, the other end 33 of which is caught in a hole 34 in one of the arms of the swinging stirrup 8. A toothed wheel 35 is arranged fixedly, and therefore non-rotatably, on the plate 30.

The operation of the device is as follows:

The number of revolutions of the flow meter is in a fixed ration to the number of revolutions of the set of stepped wheels 2. The circumferential speeds of the stepped wheels are in the ratio of their radii, that is 1:2:3: . . . :9. In order to calculate and register the price of the quantity of liquid delivered, the adjustable wheel 3, or a plurality of wheels of this kind, is brought into engagement with the wheel or wheels of the set of stepped wheels corresponding to the price. A mercury switch 37 is controlled by the locking disc 26, in the present case through the agency of the locking spring 28. Said contact is located in the circuit of the pump motor (not shown) and is only closed when the locking spring 28 has fallen into position, so that the setting in operation of the pump can only take place in the neutral or initial position of the screw spindle 18.

The revolutions or partial revolutions of the wheel 3 produced by the pump through the shaft 1 and the set of stepped wheels 2 are transmitted through the wheels 6, 7, 36 to the adding mechanism which is not shown. The selective adjustment of the wheel 3 to the various steps of the set 2 is effected by means of the turning knob 25 with the assistance of the cam disc 19 in that, when advancing the wheel 3, the pin 24 slides up on to the steps 22, 23 through turning the knob 25 to the right, the swinging stirrup 8 being swung outwards and downwardly. Let it be assumed that, at the commencement of the setting movement, the pin 24 is located at the bottom of the recess in the disc 19 and the tongue 11 is resting on the lowest step of the stepped member 12. Now, if the adjustable wheel 3 is to be adjusted to the next higher step of the set, the turning knob 25 must be turned once in a clockwise direction. During said rotation, the swinging stirrup 8 swings about the shaft 5 as its axis. At the same time, the tongue 11 of the swinging arm 4 is likewise swung about the shaft 5 with the aid of the longitudinal slot 10, the wheel 3 being brought out of engagement. Simultaneously, owing to the action of the screw spindle 18 on the nut 17 of the bar 16, the latter moves together with its fork 15 and the wheels 7, 6, 3 move simultaneously therewith in an axial direction by the amount of the width of one step. As the pin 24 runs up on to the curved portions 20, 21, the pin drops into the recess in the disc 19. The lever 4 and the stirrup 8 swing back under the action of the tension spring 32 and the toothed wheel 3 comes into engagement with the next higher step. The process when the knob 25 is rotated in the opposite direction for the purpose of carrying the toothed wheel 3 back to the next lower step is correspondingly reversed.

In order to prevent damaging the wheels as the arrangement drops into position, the curves 20, 21 and 23, 22 are subdivided in the manner of steps, so that the movement of the pin 24 is first taken up or deadened on the heel of the curve 22, 23 or 21, 20 and the pin can only drop into its end positions defined by the steps of the stepped member 12 after the knob 25 has been rotated further. The locking mechanism 26, 27, 28 is provided in order to prevent the device from being operated without the correct adjustment being made.

Said locking mechanism ensures the stopping of the screw spindle in the neutral or initial position at any given time and ensures, at the same time, both the correct longitudinal position of the movable wheel 3 on the steps of the set 2 and the positioning of the figure of the unit price in the inspection windows of the mechanism for indicating the price of the day, which is not shown. Said indicator mechanism is driven by the rotation of the screw spindle 18. If the adjustable wheel 3 is intended not to act on the adding mechanism, it is brought into engagement with the stationary wheel 35.

A mercury switch 37 is controlled by the locking spring 28, said contact closing the drive circuit of the driving motor for the pump (both not shown) or terminating a locking action exerted on the switch for said circuit only in the neutral or initial position of the screw spindle, so that the motor can only be set in operation if the screw spindle 18 is in the neutral or initial position.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

I claim:

1. A setting device for a price indicator for liquids passed through a flow meter, comprising a set of stepped gear wheels adapted to be driven by the liquid flow meter, at least one adjustable gear wheel, a screw spindle which is adjustable from the exterior, and a cam disc drivingly connected therewith, said spindle and disc being adapted to impart to the adjustable wheel swinging and axial shifting motions, for bringing said adjustable wheel progressively step by step into engagement with any selected wheel of the set of stepped wheels.

2. A setting device for a price indicator for liquids passed through a flow meter, comprising a set of stepped gear wheels adapted to be driven by the liquid flow meter, at least one adjustable gear wheel, a screw spindle which is adjustable from the exterior, and a cam disc arranged thereon, said spindle and disc being adapted to impart to the adjustable wheel swinging and axial shifting motions, for bringing said adjustable wheel progressively step by step into engagement with any selected wheel of the set of stepped wheels.

3. A setting device for a price indicator for liquids passed through a flow meter, comprising a set of stepped gear wheels adapted to be driven by the liquid flow meter, at least one adjustable gear wheel, a threaded spindle which is adjustable from the exterior, and a cam disc drivingly connected therewith, said spindle and disc being adapted to impart to the adjustable wheel swinging and axial shifting motions, for bringing said adjustable wheel progressively step by step into engagement with any selected wheel of the set of stepped wheels.

4. A setting device for a price indicator for liquids passed through a flow meter, comprising a set of stepped gear wheels adapted to be driven by the flow meter, at least one adjustable gear wheel, a threaded spindle which is adjustable from the exterior, a cam disc drivingly connected therewith, a stirrup controlled by the cam disc, a pivot for said stirrup, a two-armed lever whose one arm bears the adjustable gear wheel and whose other arm engages in a slot of the stirrup, whereby it is swung along with the stirrup, and a bifurcated member for moving said two-armed lever in a direction parallel to the axis of the set of stepped wheels by operation of the threaded spindle, said pivot being adapted to transmit the rotary motions of the adjustable wheel on to the totalizer of the price indicator.

5. A setting device for a price indicator for liquids passed through a flow meter, comprising a set of stepped gear wheels adapted to be driven by the flow meter, at least one adjustable gear wheel, a threaded spindle which is adjustable from the exterior, a cam disc drivingly connected therewith, a stirrup controlled by the cam disc, a pivot for said stirrup, a two-armed lever whose one arm bears the adjustable gear wheel and whose other arm engages in a slot of the stirrup, whereby it is swung along with the stirrup, and a bifurcated member for moving said two-armed lever in a direction parallel to the axis of the set of stepped wheels by operation of the threaded spindle, said pivot being adapted to transmit the rotary motions of the adjustable wheel onto the totalizer of the price indicator, and said cam disc comprising a control curve adapted to control the rearward swinging of the two-armed lever and of the stirrup and being subdivided in the form of steps.

6. A setting device for a price indicator for liquids passed through a flow meter, comprising a set of stepped gear wheels adapted to be driven by the flow meter, at least one adjustable gear wheel, a threaded spindle which is adjustable from the exterior, a cam disc drivingly connected therewith, a stirrup controlled by the cam disc, a pivot for said stirrup, a two-armed lever whose one arm bears the adjustable gear wheel and whose other arm engages in a slot of the stirrup, whereby it is swung along with the stirrup, a stepped stop for the rearward end of the two-armed lever, and a bifurcated member for moving said two-armed lever in a direction parallel to the axis of the set of stepped wheels by operation of the threaded spindle, said pivot being adapted to transmit the rotary motions of the adjustable wheel onto the totalizer of the price indicator.

7. A setting device for a price indicator for liquids passed through a flow meter, comprising a set of stepped gear wheels adapted to be driven by the liquid flow meter, at least one adjustable gear wheel, a screw spindle which is adjustable from the exterior, a catch device ensuring the zero position of the screw spindle, and a cam disc drivingly connected with the screw spindle, said spindle and disc being adapted to impart to the adjustable wheel swinging and axial shifting motions, for bringing said adjustable wheel progressively step by step into engagement with any selected wheel of the set of stepped wheels.

References Cited in the file of this patent

UNITED STATES PATENTS

| Number | Name | Date |
| --- | --- | --- |
| 928,705 | Scott | July 20, 1909 |
| 986,241 | Stuhlmacher | Mar. 7, 1911 |
| 2,111,996 | Slye | Mar. 22, 1938 |
| 2,124,614 | Farnham et al. | July 26, 1938 |
| 2,208,148 | Schafer | July 16, 1940 |
| 2,311,007 | Trexler | Feb. 16, 1943 |
| 2,357,163 | Barrett | Aug. 29, 1944 |
| 2,485,151 | Gorrell | Oct. 18, 1949 |
| 2,662,417 | Mascherpa | Dec. 15, 1953 |